United States Patent
MacDonald et al.

(10) Patent No.: US 11,446,723 B2
(45) Date of Patent: Sep. 20, 2022

(54) METHODS AND SYSTEMS FOR AUTOMATICALLY ADJUSTING OPERATIONAL PARAMETERS OF ONE OR MORE LEVELING MACHINES

(71) Applicant: Honda Motor Co., Ltd., Tokyo (JP)

(72) Inventors: Byron Wade MacDonald, Barrie (CA); Matthew David Brown, Barrie (CA); David Naughton, Coldwater (CA); Chanakya Chauhan, Alliston (CA); Paul Adams Thompson, Lisle (CA)

(73) Assignee: Honda Motor Co., LTD., Tokyo (JP)

( * ) Notice: Subject to any disclaimer, the term of this patent is extended or adjusted under 35 U.S.C. 154(b) by 184 days.

(21) Appl. No.: 16/805,069

(22) Filed: Feb. 28, 2020

(65) Prior Publication Data

US 2021/0268564 A1    Sep. 2, 2021

(51) Int. Cl.
*B21D 1/02* (2006.01)
*G05B 19/402* (2006.01)

(52) U.S. Cl.
CPC ............. *B21D 1/02* (2013.01); *G05B 19/402* (2013.01); *G05B 2219/32128* (2013.01); *G05B 2219/45234* (2013.01)

(58) Field of Classification Search
CPC ... C07C 303/16; C07C 309/04; C07C 309/05; B01J 19/0006; B01J 2219/0004; B01J 2219/00707; B21D 1/02; B30B 15/26; G05B 19/402; G05B 2219/32128; G05B 2219/45234
See application file for complete search history.

(56) References Cited

U.S. PATENT DOCUMENTS

| | | | |
|---|---|---|---|
| 4,094,426 A * | 6/1978 | Vogel | B23Q 7/055 414/431 |
| 4,454,738 A | 6/1984 | Buta | |
| 6,920,774 B1 | 7/2005 | Bergman et al. | |
| 8,250,891 B2 | 8/2012 | Chung et al. | |
| 2008/0078751 A1* | 4/2008 | Abrott | B23K 26/032 219/121.69 |
| 2008/0281459 A1* | 11/2008 | Liu | G05B 19/4097 700/165 |
| 2015/0266071 A1* | 9/2015 | Sexton | B21B 1/166 72/7.1 |
| 2020/0094303 A1* | 3/2020 | Smith | B21D 19/043 |

FOREIGN PATENT DOCUMENTS

| | | |
|---|---|---|
| CN | 102019306 B | 9/2013 |
| CN | 205684525 U | 11/2016 |
| CN | 105251765 B | 4/2017 |
| CN | 207057483 U | 3/2018 |
| KR | 101031686 B1 | 4/2011 |

* cited by examiner

*Primary Examiner* — Kidest Bahta
(74) *Attorney, Agent, or Firm* — Stinson LLP

(57) ABSTRACT

A leveling machine is automatically adjustable. A plurality of blank conditions are presented at a user interface. A selection of a first blank condition is received at the user interface. An arrangement of the rollers is determined based on the selection of the first blank condition. The rollers are moved based on the determined arrangement.

20 Claims, 8 Drawing Sheets

METHODS AND SYSTEMS FOR AUTOMATICALLY ADJUSTING OPERATIONAL PARAMETERS OF ONE OR MORE LEVELING MACHINES

BACKGROUND

Some work materials (e.g., steel, aluminum) may be flattened using a leveling machine to produce one or more blanks. A metal strip, sheet, or plate, for example, may be passed through a plurality of rollers that exert bending forces to form the metal strip, sheet, or plate into a desired shape. To accommodate work materials of various widths, gauges, and/or types, at least some rollers are precisely moved and/or positioned. Manually adjusting the rollers of known leveling machines, however, may be difficult and/or time-consuming. Properly adjusting at least some known leveling machines requires a high level of skill, which is often developed over time and/or through trial and error.

SUMMARY

Examples of the disclosure enable a leveling machine to be automatically adjusted. In one aspect, a method is provided for automatically adjusting operational parameters of a leveling machine including a plurality of rollers. The method includes presenting, at a user interface, a plurality of blank conditions, receiving, at the user interface, a selection of a first blank condition of the blank conditions, determining an arrangement of the rollers based on the selection of the first blank condition, and moving the rollers based on the determined arrangement.

In another aspect, a system is provided. The system includes a roller assembly including a plurality of rollers, and a control unit configured to present, at a user interface, a plurality of blank conditions, receive, at the user interface, first user input associated with a first blank condition of the blank conditions, determine an arrangement of the rollers based on the first blank condition, and communicate with the roller assembly to move the rollers based on the arrangement.

In yet another aspect, a control unit is provided. The control unit includes an interface component configured to present a plurality of blank conditions and receive first user input associated with a first blank condition of the blank conditions, and a servo component configured to determine an arrangement of a plurality of rollers based on the first blank condition, and move the rollers based on the arrangement.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Figure 1:
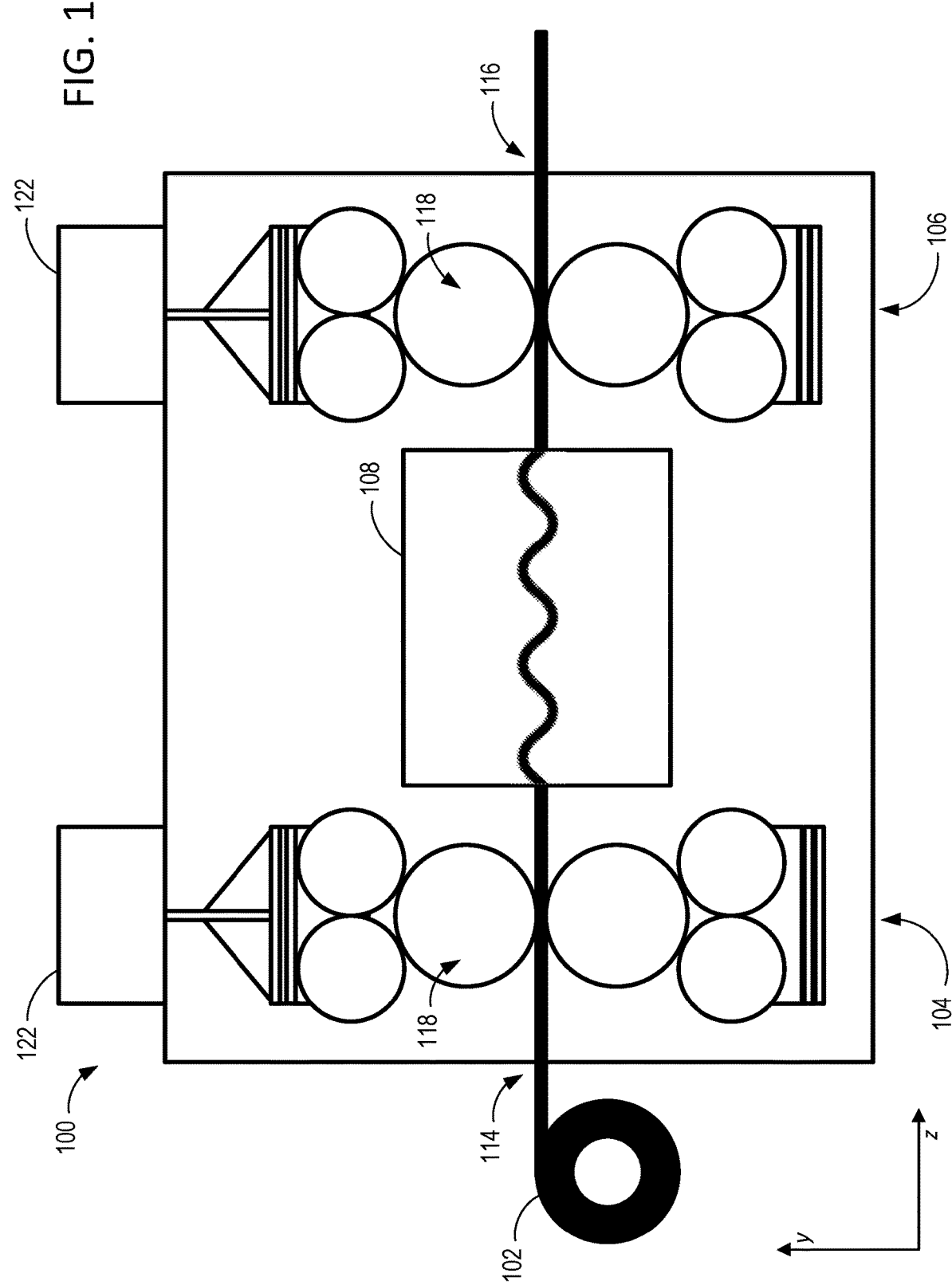
FIG. 1 is a schematic side view of an example leveling machine.

Corresponding reference characters indicate corresponding parts throughout the drawings. Although specific features may be shown in some of the drawings and not in others, this is for convenience only. In accordance with the examples described herein, any feature of a drawing may be referenced and/or claimed in combination with any feature of any other drawing.

DETAILED DESCRIPTION

The present disclosure relates to manufacturing systems and, more particularly, to methods and systems for automatically adjusting operational parameters of one or more leveling machines. Example leveling machines may include, for example, levelers, flatteners, straighteners, and roller levelers. Examples described herein present a plurality of blank conditions, receiving a selection of a first blank condition, determining an arrangement of the rollers based on the selection of the first blank condition, and moving the rollers based on the determined arrangement. Example systems described herein use an interactive graphical user interface to provide easy-to-understand, efficient, and precise operation of a leveling system. A touchscreen interface, for example, may allow a user to select the condition of a first blank and move a slider icon to a severity or degree of the condition. One or more rollers may be automatically adjusted based on the selection to reduce and/or eliminate the condition in subsequent blanks.

Certain terminology is used to describe the examples in the present disclosure for convenience and reference only and not in a limiting sense. For example, the terms "upper," "lower," "over," "under," "left," "right" and the like designate directions in relation to the perspective shown in the drawings and/or described in the specification. One of ordinary skill in the art would understand and appreciate that the example methods and systems may be used in various orientations. Moreover, while the examples described herein are described in regard to processing sheet metal workpieces, one of ordinary skill in the art would understand and appreciate that the example methods and systems may be used for processing other work materials.

FIG. 1 shows an example leveling machine 100 configured to work or process one or more work materials (e.g., steel, aluminum, etc.). The leveling machine 100 may be used, for example, to remove or reduce a curl, bend, and/or other physical feature of a sheet metal workpiece 102. Example leveling machines 100 include levelers, flatteners, straighteners, and roller levelers.

The leveling machine 100 includes a first portion 104 (e.g., a "front" portion), a second portion 106 opposite the first portion 104 (e.g., a "rear" portion), and a roller assembly 108 between the first portion 104 and second portion 106. In some examples, the first portion 104 includes an entrance 114, through which the sheet metal workpiece 102 may enter the leveling machine 100. Additionally or alternatively, the second portion 106 includes an exit 116, through which the sheet metal workpiece 102 may leave the leveling machine 100.

The first portion 104 and/or second portion 106 may include a plurality of pinch rollers 118 that receive and/or guide the sheet metal workpiece 102 as the sheet metal workpiece 102 enters and/or leaves the leveling machine 100, respectively. Alternatively, the sheet metal workpiece 102 may be moved through the leveling machine 100 in any manner that enables the sheet metal workpiece 102 to be flattened as described herein. In some examples, one or more pinch rollers 118 are vertically adjustable (e.g., generally along the Y-axis) using one or more servomotors 122. In this manner, an elevation of the sheet metal workpiece 102 may be selectively increased, decreased, or maintained as the sheet metal workpiece 102 passes through the leveling machine 100.

Figure 2:
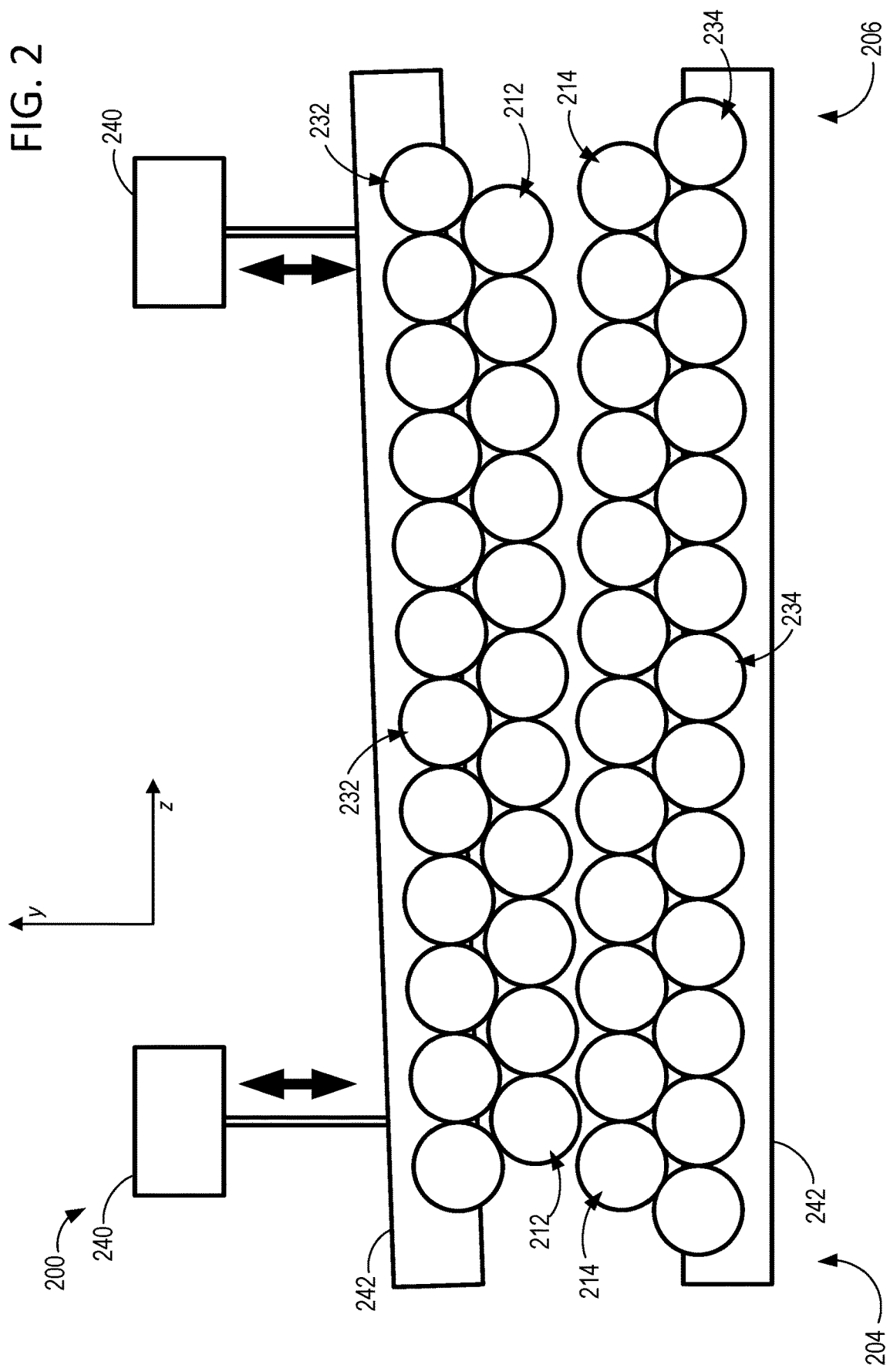
FIG. 2 is a schematic side view of a roller system that may be used with the leveling machine shown in FIG. 1.
Figure 3:
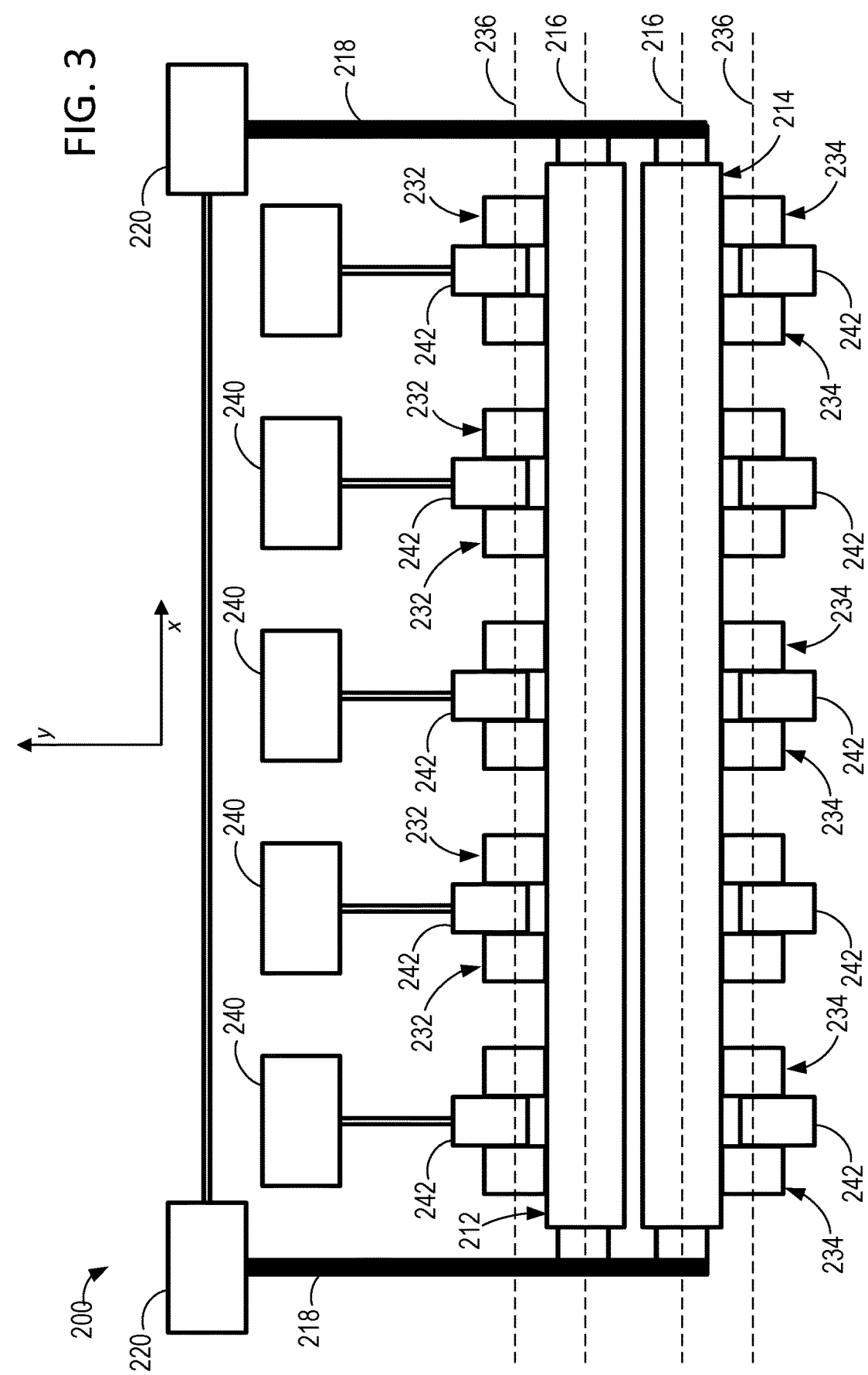
FIG. 3 is a schematic rear view of the roller system shown in FIG. 2.

FIGS. 2 and 3 show an example roller assembly 200 (e.g., roller assembly 108) that may be used with the leveling machine 100. The roller assembly 200 may be positioned such that a front portion 204 (shown in FIG. 2) is at or adjacent to the entrance 114 of the leveling machine 100 and a rear portion 206 (shown in FIG. 2) is at or adjacent to the exit 116 of the leveling machine 100. Alternatively, the roller assembly 200 may be positioned in any orientation that enables the leveling machine 100 to function as described herein.

The roller assembly 200 includes a plurality of upper rollers 212 and a plurality of lower rollers 214. In some examples, each upper roller 212 and lower roller 214 is rotatable about a respective rotational axis 216 (shown in FIG. 3) extending laterally across the roller assembly 200 (e.g., generally along the X-axis). One or more upper rollers 212 and/or lower rollers 214 may be driven or rotated using one or more timing belts 218 (shown in FIG. 3) and one or more servomotors 220 (shown in FIG. 3) coupled to the timing belts 218. Alternatively, the upper rollers 212 and/or lower rollers 214 may be driven or rotated using any other driving mechanism that enables the roller assembly 200 to function as described herein.

In some examples, the upper rollers 212 are serially positioned (e.g., in a line) between the front portion 204 and rear portion 206 (e.g., generally along the Z-axis) and spaced from each other. The lower rollers 214 may also be serially positioned (e.g., in a line) between the front portion 204 and rear portion 206 (e.g., generally along the Z-axis) and spaced from each other. As shown in FIG. 2, the upper rollers 212 may be offset from the lower rollers 214 such that one or more upper rollers 212 are positionable in tangential or nesting contact between an adjacent pair of lower rollers 214 (e.g., a first upper roller 212 may be lowered to come in contact with a first lower roller 214 and a second lower roller 214).

The upper rollers 212 may be moved generally downwardly toward the lower rollers 214 (e.g., generally in a negative direction along the Y-axis) and/or the lower rollers 214 may be moved generally upwardly toward the upper rollers 212 (e.g., generally in a positive direction along the Y-axis) to decrease a distance between the upper rollers 212 and lower rollers 214. Conversely, the upper rollers 212 may be moved generally upwardly away from the lower rollers 214 and/or the lower rollers 214 may be moved generally downwardly away from the upper rollers 212 to increase the distance between the upper rollers 212 and lower rollers 214. The upper rollers 212 and/or lower rollers 214 may be vertically adjusted in any manner and/or using any other driving mechanism that enables the roller assembly 200 to function as described herein.

In some examples, the upper rollers 212 and/or lower rollers 214 are positioned such that the distance between the upper rollers 212 and lower rollers 214 increases from the front portion 204 toward the rear portion 206. One or more upper rollers 212 and/or lower rollers 214 may be independently adjusted. Alternatively, the upper rollers 212 (e.g., as a unit) may be positively tilted such that an elevation of an upper roller 212 at the front portion 204 is lower than an elevation of an upper roller 212 at the rear portion 206, and/or the lower rollers 214 (e.g., as a unit) may be negatively tilted such that an elevation of a lower roller 214 at the front portion 204 is higher than an elevation of a lower roller 214 at the rear portion 206.

In some examples, the roller assembly 200 includes a plurality of upper backup rollers 232 positioned over the upper rollers 212 and/or a plurality of lower backup rollers 234 positioned under the lower rollers 214. The upper backup rollers 232 and/or lower backup rollers 234 may be positioned and/or moved to provide physical or structural support to the upper rollers 212 and/or lower rollers 214, respectively (e.g., for selectively positioning the upper rollers 212 in tangential or nesting contact with the lower rollers 214). In some examples, each upper backup roller 232 and/or lower backup roller 234 may be rotatable about a respective rotational axis 236 (shown in FIG. 3) extending laterally across the roller assembly 200 (e.g., generally along the X-axis).

The upper backup rollers 232 may be arranged in a plurality of flights that are laterally spaced from each other (e.g., generally along the X-axis) across a width of the upper rollers 212. In some examples, each flight of upper backup rollers 232 includes upper backup rollers 232 that are serially positioned (e.g., in a line) between the front portion 204 and rear portion 206 (e.g., generally along the Z-axis) and spaced from each other. As shown in FIG. 2, the flight of upper backup rollers 232 may be offset from the upper rollers 212 such that one or more upper backup rollers 232 are positionable in tangential or nesting contact between an adjacent pair of upper rollers 212. In some examples, a first flight of upper backup rollers 232 are positionable in tangential or nesting contact between a first set of adjacent pairs of upper rollers 212 (e.g., between the first and second upper rollers 212, the third and fourth upper rollers 212, etc.), and a second flight of upper backup rollers 232 are positionable in tangential or nesting contact between a second set of adjacent pairs of upper rollers 212 complementing the first set of adjacent pairs of upper rollers 212 (e.g., between the second and third upper rollers 212, the fourth and fifth upper rollers 212, etc.). Alternatively, the upper backup rollers 232 may be arranged in any manner that allows the roller assembly 200 to function as described herein.

The lower backup rollers 234 may also be arranged in a plurality of flights that are laterally spaced from each other (e.g., generally along the X-axis) across a width of the lower rollers 214. In some examples, each flight of lower backup rollers 234 includes lower backup rollers 234 that are serially positioned (e.g., in a line) between the front portion 204 and rear portion 206 (e.g., generally along the Z-axis) and spaced from each other. As shown in FIG. 2, the flight of lower backup rollers 234 may be offset from the lower rollers 214 such that one or more lower backup rollers 234 are positionable in tangential or nesting contact between an adjacent pair of lower rollers 214. In some examples, a first flight of lower backup rollers 234 are positionable in tangential or nesting contact between a first set of adjacent pairs of lower rollers 214 (e.g., between the first and second lower rollers 214, the third and fourth lower rollers 214, etc.), and a second flight of lower backup rollers 234 are positionable in tangential or nesting contact between a second set of adjacent pairs of lower rollers 214 complementing the first set of adjacent pairs of lower rollers 214 (e.g., between the second and third lower rollers 214, the fourth and fifth lower rollers 214, etc.). Alternatively, the lower backup rollers 234 may be arranged in any manner that allows the roller assembly 200 to function as described herein.

In some examples, the upper backup rollers 232 and/or lower backup rollers 234 are vertically adjustable using one or more servomotors 240 (shown in FIG. 2). For example, the servomotors 240 may be actuated to move the upper backup rollers 232 generally downwardly toward the upper rollers 212 (e.g., generally in a negative direction along the Y-axis) and/or the lower backup rollers 234 generally upwardly toward the lower rollers 214 (e.g., generally in a positive direction along the Y-axis) to provide physical or structural support to the upper rollers 212 and/or lower rollers 214, respectively. In this manner, a distance between the upper rollers 212 and lower rollers 214 may be maintained or decreased. Conversely, the servomotors 240 may be actuated to move the upper backup rollers 232 generally upwardly away from the upper rollers 212 and/or the lower backup rollers 234 generally downwardly away from the lower rollers 214 to facilitate decreasing the amount of physical or structural support provided to the upper rollers 212 and/or lower rollers 214, respectively. In this manner, a distance between the upper rollers 212 and lower rollers 214 may be increased. Alternatively, the upper backup rollers 232 and/or lower backup rollers 234 may be vertically adjusted in any manner and/or using any other driving mechanism that enables the roller assembly 200 to function as described herein. In some examples, the servomotors 240 are configured to independently adjust one or more upper backup rollers 232 and/or lower backup rollers 234.

In some examples, the upper backup rollers 232 and/or lower backup rollers 234 are coupled to a plurality of beams 242 extending longitudinally between the front portion 204 and rear portion 206 (e.g., generally along the Z-axis). As shown in FIG. 3, a first flight of upper backup rollers 232 may be coupled to a first side (e.g., a left side) of a beam 242, and/or a second flight of upper backup rollers 232 may be coupled to a second side (e.g., a right side) of the beam 242. In some examples, each beam 242 is vertically adjustable independent of or free from the other beams 242 using one or more servomotors (e.g., servomotors 240). For example, the servomotors 240 may be actuated to move one or more beams 242 at the front portion 204 and/or rear portion 206 such that the beams 242 are vertically translated, positively tilted (e.g., elevation at the front portion 204 is lower than elevation at the rear portion 206), and/or negatively tilted (e.g., elevation at the front portion 204 is higher than elevation at the rear portion 206). In some examples, the one or more beams 242 are articulated such that one portion of the beam 242 may be moved independent of or free from another portion of the beam 242.

During use, the upper rollers 212 and/or lower rollers 214 may be driven using one or more timing belts 218 and/or servomotors 220 to move the sheet metal workpiece 102 through the roller assembly 200. The upper rollers 212 and/or lower rollers 214 may be moved to selectively control the amount of flex or bending of the sheet metal workpiece 102 as the sheet metal workpiece 102 is moved through the roller assembly 200. In some examples, one or more upper backup rollers 232 and/or lower backup rollers 234 are positioned to support or urge one or more upper rollers 212 and lower rollers 214 in or toward a nested arrangement, that is, where a first upper roller 212 is positioned between a first lower roller 214 and a second lower roller 214. In some examples, the sheet metal workpiece 102 is received at the front portion 204 and guided between the upper roller 212 and lower rollers 214 along a path towards the rear portion 206. As shown in FIG. 2, the path may extend below the upper rollers 212 and above the lower rollers 214. In this manner, the sheet metal workpiece 102 may be flexed a predetermined amount in one direction as that portion of the workpiece passes between a first lower roller 214 and a first upper roller 212 and then a predetermined amount in the opposite direction as that portion of the workpiece passes between the first upper roller 212 and a second lower roller 214. Decreasing the amount of flex as the sheet metal workpiece 102 is moved through the leveling machine 100 facilitates removing or reducing curls and/or bends of the sheet metal workpiece 102. Furthermore, the location on the workpiece 102 where the bending is applied can be controlled in order to more accurately level the workpiece 102.

The roller assembly 200 is configured to produce a flat or level blank from the sheet metal workpiece 102. The blank may be flat, for example, when the material lengths are generally the same or equal across a width of the sheet metal workpiece 102. On the other hand, the blank may not be flat when the material lengths of the sheet metal workpiece 102 at various portions of the sheet metal workpiece 102 are different.

For example, the roller assembly 200 may produce a blank having an edge wave on each side when the sides of the sheet metal workpiece 102 have material lengths that are longer than a material length of the center of the sheet metal workpiece 102. To produce a flat blank, the roller assembly 200 may be adjusted to increase the material length of the center of the sheet metal workpiece 102 such that the material length of the center of the sheet metal workpiece 102 is the same as or substantially equal to the material lengths of the sides of the sheet metal workpiece 102. In some examples, a flight of upper backup rollers 232 and/or lower backup rollers 234 at the center are adjusted to urge the upper rollers 212 and lower rollers 214 such that a space or gap therebetween is smaller at the center than it is at the sides (e.g., bending or flexing the upper rollers 212 and/or lower rollers 214 at the center). In this manner, the center of the sheet metal workpiece 102 may be forced to traverse a relatively long path below the upper rollers 212 and above the lower rollers 214, thereby stretching the center of the sheet metal workpiece 102. Additionally or alternatively, the flights of upper backup rollers 232 and/or lower backup rollers 234 at the sides may be adjusted to decrease the amount of physical of structural support provided to the upper rollers 212 and/or lower rollers 214, thereby allowing the gap between the upper rollers 212 and lower rollers 214 to increase at the sides, which, in turn, allows the sides of the sheet metal workpiece 102 to traverse a relatively short path below the upper rollers 212 and above the lower rollers 214.

For another example, the roller assembly 200 may produce a blank having an edge wave on one side (e.g., the left side or the right side) when the one side of the sheet metal workpiece 102 has a material length that is longer than that of the other portions of the sheet metal workpiece 102. To produce a flat blank, the roller assembly 200 may be adjusted to increase the material lengths of the other portions of the sheet metal workpiece 102 such that the material lengths of the other portions of the sheet metal workpiece 102 are the same as or substantially equal to the material length of the one side of the sheet metal workpiece 102. In some examples, the flights of upper backup rollers 232 and/or lower backup rollers 234 at the center and the other side are adjusted to urge the upper rollers 212 and lower rollers 214 such that a space or gap therebetween is smaller at the center and the other side than it is at the one side with the edge wave. In this manner, the center and other side of the sheet metal workpiece 102 may be forced to traverse a relatively long path below the upper rollers 212 and above the lower rollers 214, thereby stretching the center and other side of the sheet metal workpiece 102. Additionally or alternatively, the flight of upper backup rollers 232 and/or lower backup rollers 234 at the one side with the edge wave may be adjusted to decrease the amount of physical of structural support provided to the upper rollers 212 and/or lower rollers 214, thereby allowing the gap between the upper rollers 212 and lower rollers 214 to increase at the one side with the edge wave, which, in turn, allows the one side of the sheet metal workpiece 102 to traverse a relatively short path below the upper rollers 212 and above the lower rollers 214.

For yet another example, the roller assembly 200 may produce a blank having a center buckle when the center of the sheet metal workpiece 102 has a material length that is longer than that of the sides of the sheet metal workpiece 102. To produce a flat blank, the roller assembly 200 may be adjusted to increase the material length of the sides of the sheet metal workpiece 102 such that the material length of the sides of the sheet metal workpiece 102 are the same as or substantially equal to the material length of the center of the sheet metal workpiece 102. In some examples, a flight of upper backup rollers 232 and/or lower backup rollers 234 at the sides are adjusted to urge the upper rollers 212 and lower rollers 214 such that a space or gap therebetween is smaller at the sides than it is at the center. In this manner, the sides of the sheet metal workpiece 102 may be forced to traverse a relatively long path below the upper rollers 212 and above the lower rollers 214, thereby stretching the sides of the sheet metal workpiece 102. Additionally or alternatively, the flight of upper backup rollers 232 and/or lower backup rollers 234 at the center may be adjusted to decrease the amount of physical of structural support provided to the upper rollers 212 and/or lower rollers 214, thereby allowing the gap between the upper rollers 212 and lower rollers 214 to increase at the center, which, in turn, allows the center of the sheet metal workpiece 102 to traverse a relatively short path below the upper rollers 212 and above the lower rollers 214.

Figure 4:
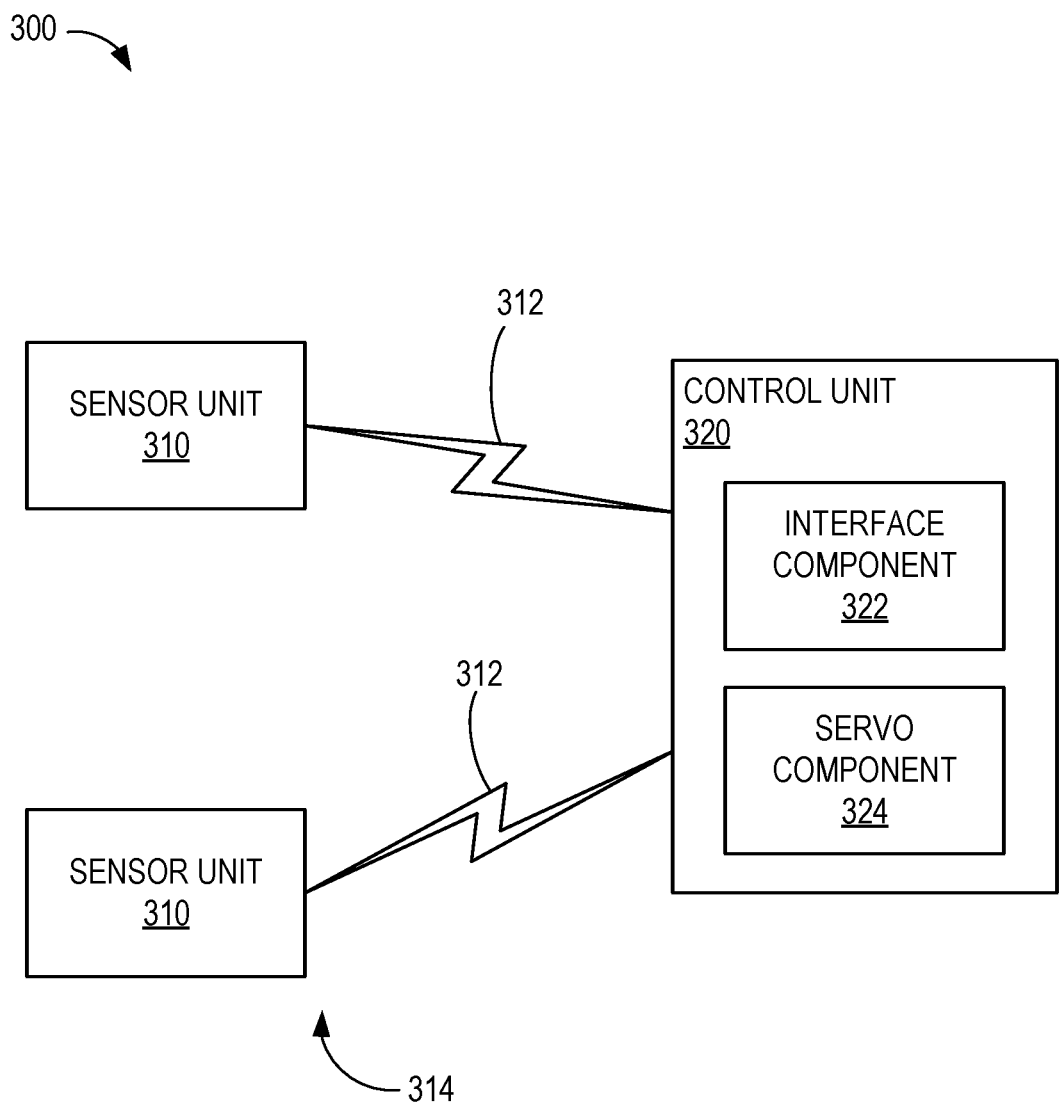
FIG. 4 is a schematic block diagram of a system that may be used with a leveling machine, such as the leveling machine shown in FIG. 1.

FIG. 4 shows an example system 300 (e.g., leveling machine 100) configured to work or process one or more work materials (e.g., steel, aluminum, etc.). The system 300 includes one or more sensor units 310 configured to detect one or more stimuli, and generate data or one or more signals 312 associated with the stimuli. The sensor units 310 may be used, for example, to detect a position and/or movement of the sheet metal workpiece 102, entrance 114, exit 116, pinch rollers 118, upper rollers 212, lower rollers 214, upper backup rollers 232, lower backup rollers 234, beams 242, and/or any other object in an environment 314. Example sensor units 310 include, without limitation, a microphone, an electrostatic sensor, a piezoelectric sensor, a camera, an image sensor, a photoelectric sensor, an infrared sensor, an ultrasonic sensor, a microwave sensor, a magnetometer, a motion sensor, a receiver, a transceiver, and any other device configured to detect a stimulus in the environment 314.

The sensor units 310 may transmit or provide the signals 312 to a control unit 320 for processing. The control unit 320 may communicate with one or more devices (e.g., sensor units 310) using one or more communication protocols. Example communication protocols include, without limitation, a BLUETOOTH® brand communication protocol, a ZIGBEE® brand communication protocol, a Z-WAVE™ brand communication protocol, a WI-FI® brand communication protocol, a near field communication (NFC) communication protocol, a radio frequency identification (RFID) communication protocol, and a cellular data communication protocol (BLUETOOTH® is a registered trademark of Bluetooth Special Interest Group ZIGBEE® is a registered trademark of ZigBee Alliance Corporation, and Z-WAVE™ is a trademark of Sigma Designs, Inc. WI-FI® is a registered trademark of the Wi-Fi Alliance).

The control unit 320 is configured to analyze the signals 312 received or retrieved from the sensor units 310 to recognize or identify one or more features associated with the stimuli detected by the sensor units 310. In this manner, the environment 314 may be continuously monitored while work material is being moved through the leveling machine 100. In some examples, the control unit 320 includes one or more filters that remove at least some undesired portions ("noise") from the signals 312, and/or one or more decoders that convert one or more signals 312 into one or more other forms. A decoder may convert, for example, an analog signal into a digital form.

The control unit 320 includes an interface component 322 for communicating with one or more operators or users. The interface component 322 is configured to present one or more features associated with the stimuli detected by the sensor units 310. The interface component 322 may receive, for example, user input associated with a blank condition and/or a severity or degree of the blank condition. In some examples, the interface component 322 presents indicia and/or icons representing a plurality of blank conditions and/or a plurality of degrees of the blank condition to a user, and receives inputs from the user corresponding to a selected blank condition and/or a selected degree of the blank condition in response to the presentation.

The control unit 320 includes a servo component 324 for controlling and/or actuating one or more servomotors (e.g., servomotor 122, servomotor 220, servomotor 240). The servo component 324 is configured to automatically control and/or move one or more means for adjusting the entrance 114, exit 116, pinch rollers 118, upper rollers 212, lower rollers 214, upper backup rollers 232, lower backup rollers 234, and/or beams 242 to remove or reduce one or more curls, bends, and/or other physical features of the sheet metal workpiece 102. The servo component 324 enables the entrance 114, exit 116, pinch rollers 118, upper rollers 212, lower rollers 214, upper backup rollers 232, lower backup rollers 234, and/or beams 242 to be precisely positioned.

The servo component 324 may communicate with the interface component 322, for example, to calculate or determine an arrangement of a plurality of rollers (e.g., pinch roller 118, upper roller 212, lower roller 214, upper backup roller 232, lower backup roller 234) based on the blank condition and/or the degree of the blank condition and move and/or adjust the rollers based on the arrangement. Determining may include, for example, interpreting user input, accessing stored operating parameters associated with the blank condition (e.g., from a database) and/or calculating operating parameters based on the blank condition (e.g., using an algorithm or lookup table). In some examples, the servo component 324 communicates with the interface component 322 to present one or more parameters associated with the arrangement. Additionally, the interface component 322 may receive user input associated with one or more features of the work material (e.g., gauge, width, grade, type), and communicate with the servo component 324 to adjust the arrangement of the plurality of rollers based on the one or more features associated with the work material.

Figure 5:
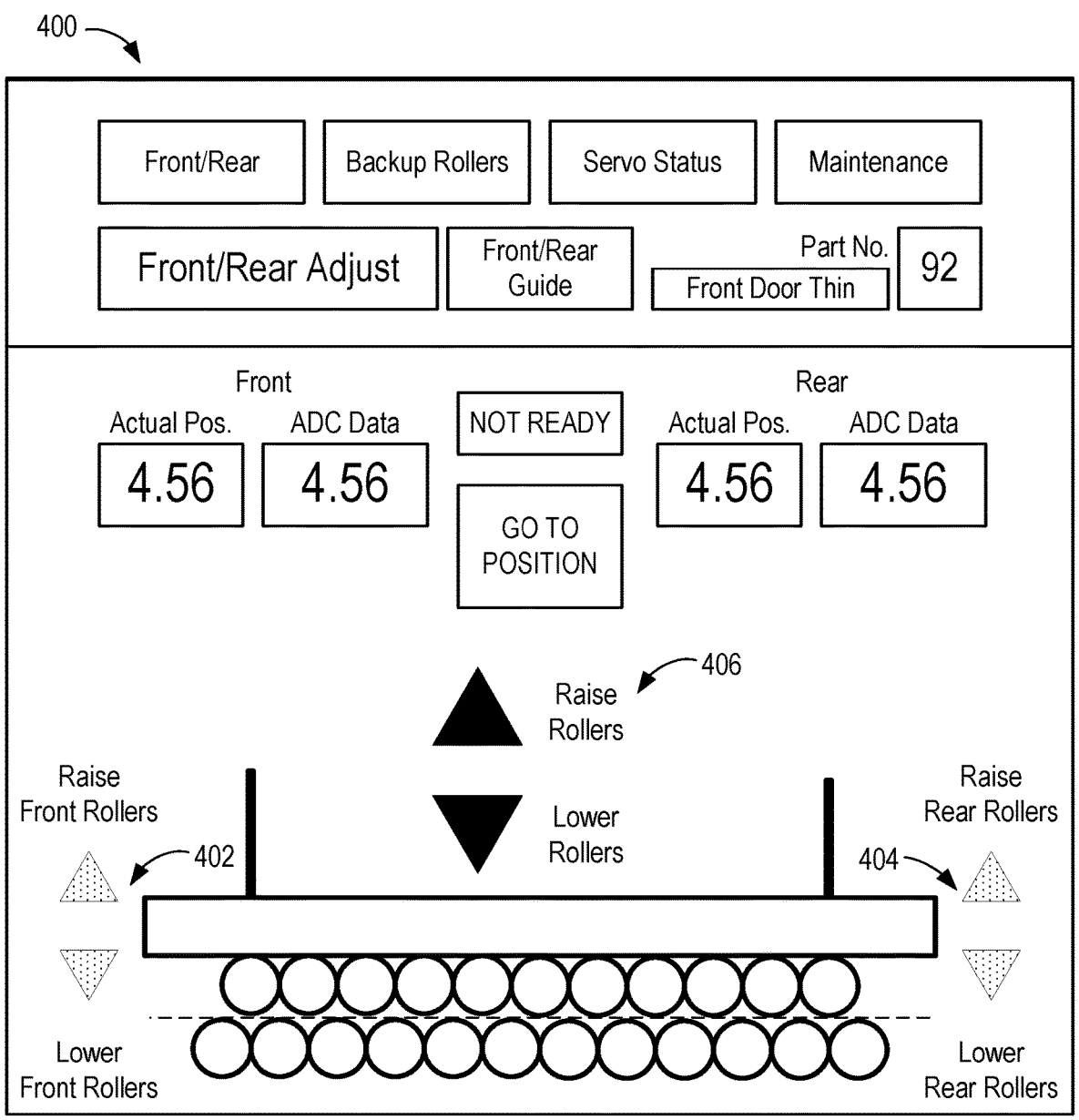
FIGS. 5 and 6 are schematic graphical user interfaces that may be used with a leveling machine, such as the leveling machine shown in FIG. 1.

FIG. 5 shows a first graphical user interface (GUI) 400 that may be used to operate the leveling machine 100 (e.g., using the system 300). As shown in FIG. 5, the GUI 400 may be associated with adjusting an entry (e.g., at front portion 204) and/or exit (e.g., at rear portion 206) of a roller assembly 200. In some examples, the GUI 400 shows a schematic side view of the roller assembly 200. The GUI 400 may be used to present (e.g., display) and/or set (e.g., by receiving user input) one or more leveler parameters, such as an elevation and/or slope of the upper rollers 212. For example, the GUI 400 may include a first area 402 for presenting and/or setting an elevation of an upper roller 212 at the front portion 204, a second area 404 for presenting and/or setting an elevation of an upper roller 212 at the rear portion 206, and a third area 406 for presenting and/or setting an elevation of all of the upper rollers 212.

Figure 6:
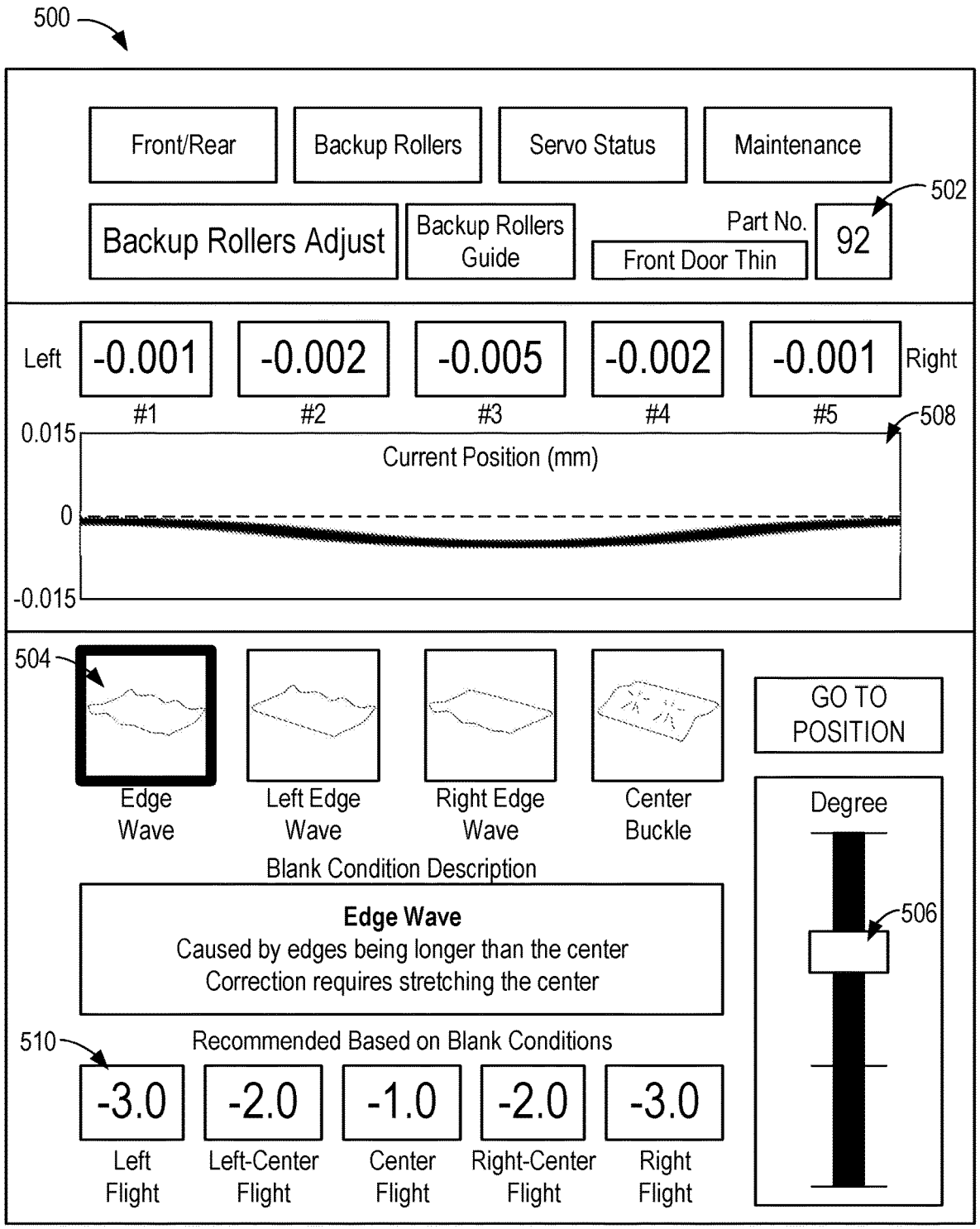

FIG. 6 shows a second GUI 500 that may be used to operate the leveling machine 100 (e.g., using the system 300). As shown in FIG. 6, the GUI 500 may be associated with adjusting a plurality of upper backup rollers 232. In some examples, the GUI 500 shows a schematic end view of a sheet metal workpiece 102. The GUI 500 may be used to present (e.g., display) and/or set (e.g., by receiving user input) one or more leveler parameters, such as a material type and/or an elevation of each flight of upper backup rollers 232. For example, the GUI 500 may include a first area 502 for presenting and/or setting a material type of the sheet metal workpiece 102, a second area 504 for presenting and/or setting a blank condition of a first blank produced from the sheet metal workpiece 102, and a third area 506 for presenting and/or setting a degree associated with the blank condition of the first blank produced from the sheet metal workpiece 102. As shown in FIG. 6, the GUI 500 may present a current position of the upper backup rollers 232 relative to a neutral position, in which the upper backup rollers 232 are straight and parallel.

In some examples, the GUI 500 is used to present one or more parameters associated with the sheet metal workpiece 102, entrance 114, exit 116, pinch rollers 118, upper rollers 212, lower rollers 214, upper backup rollers 232, lower backup rollers 234, beams 242, and/or any other object in an environment 314. For example, a position or form of the sheet metal workpiece 102 may be presented graphically and/or textually at a fourth area 508. For another example, a position or arrangement of the rollers (e.g., upper rollers 212, lower rollers 214, upper backup rollers 232, lower backup rollers 234) may be presented graphically and/or textually at a fifth area 510. In some examples, one or more parameters are determined using one or more sensor units 310.

Figure 7:
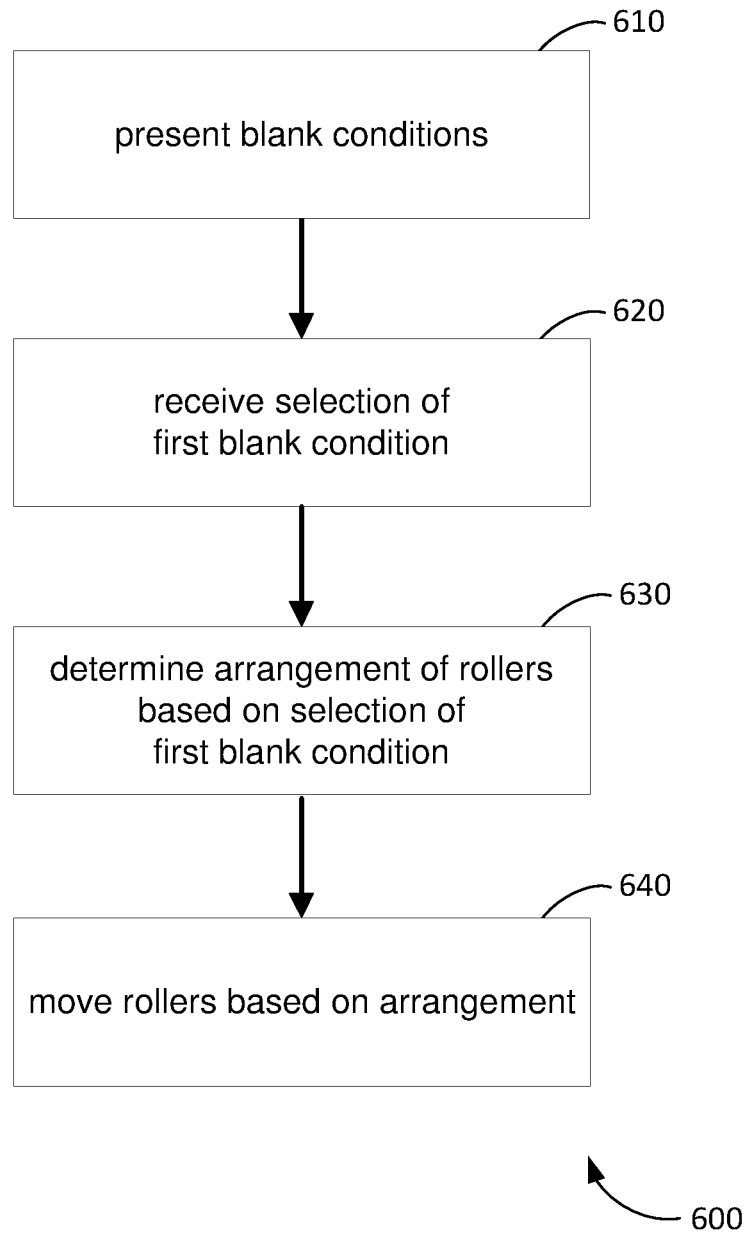
FIG. 7 is a flowchart of an example method of automatically leveling one or more blanks using a leveling machine, such as the leveling machine shown in FIG. 1.

FIG. 7 shows an example method 600 for automatically adjusting operational parameters of a leveling machine 100 (e.g., using the system 300). The method 600 may be implemented to automatically level one or more blanks. In some examples, one or more rollers (e.g., upper rollers 212, lower rollers 214, upper backup rollers 232, lower backup rollers 234) are set or established based on one or more features associated with a work material, such as a material type, thickness, and/or yield strength. For example, a user may enter a part number in a field (e.g., first area 502) to provide user input associated with the material type, thickness, and/or yield strength. In some examples, an arrangement of one or more rollers (e.g., upper rollers 212, lower rollers 214, upper backup rollers 232, lower backup rollers 234) is automatically determined based on the set features associated with the work material. Alternatively, a stored set of operating parameters associated with the part number are recalled from a memory and applied to operation of the system 300.

At operation 610, a plurality of blank conditions are presented to the user at the GUI 500 for selection. As shown in FIG. 6, example blank conditions include, without limitation, (i) "Edge Wave" for a blank having an edge wave on each side, (ii) "West Edge Wave" for a blank having an edge wave on a first side, (iii) "East Edge Wave" for a blank having an edge wave on a second side, and (iv) "Center Buckle" for a blank having a center buckle.

At operation 620, a selection of a first blank condition is received from the user at the GUI 500. A button and/or icon displayed in the second area 504, for example, may be used to provide user input associated with the first blank condition. Alternatively, one or more sensor units 310 may be used to automatically determine the first blank condition. In some examples, the first blank condition is representative of an actual blank condition of a first blank produced by the leveling machine 100.

At operation 630, an arrangement of the rollers (e.g., upper rollers 212, lower rollers 214, upper backup rollers 232, lower backup rollers 234) may be automatically calculated or determined based on the first blank condition. At operation 640, one or more rollers (e.g., upper rollers 212, lower rollers 214, upper backup rollers 232, lower backup rollers 234) may be automatically moved based on the determined arrangement. For example, if the selected blank condition is an "Edge Wave," the flights of upper backup rollers 232 at the center may be lowered and/or the flights of lower backup rollers 234 at the center may be raised while the flights of upper backup rollers 232 at the sides may be raised and/or the flights of lower backup rollers 234 at the sides may be lowered. For another example, if the blank condition is an "West Edge Wave" or "East Edge Wave," the flights of upper backup rollers 232 at the center and the non-selected side may be lowered and/or the flights of lower backup rollers 234 at the center and the non-selected side may be raised while the flights of upper backup rollers 232 at the selected side may be raised and/or the flights of lower backup rollers 234 at the selected side may be lowered. For yet another example, if the blank condition is a "Center Buckle," the flights of upper backup rollers 232 at the center may be raised and/or the flights of lower backup rollers 234 at the center may be lowered while the flights of upper backup rollers 232 at the sides may be lowered and/or the flights of lower backup rollers 234 at the sides may be raised.

In some examples, a plurality of blank condition severities or degrees are presented to the user at the GUI 500 for selection, and a severity or degree of the first blank condition is determined based on user input provided at the GUI 500. A button and/or icon displayed in the third area 506, for example, may be used to provide user input associated with the degree of the first blank condition. As shown in FIG. 6, the selection may be made using a slider icon where moving the slider icon to a first end of a track corresponds to a lower blank condition severity and moving the slider icon to a second end of the track opposite the first end corresponds to a higher blank condition severity. Table 1 shows example arrangements for various degrees of an "Edge Wave" blank condition. Alternatively, one or more sensor units 310 may be used to automatically determine the degree of the first blank condition. In some examples, the degree of the first blank condition is representative of the degree of the actual blank condition of the first blank produced by the leveling machine 100. In some examples, one or more rollers (e.g., upper rollers 212, lower rollers 214, upper backup rollers 232, lower backup rollers 234) are automatically moved and/or adjusted based on the determined degree.

TABLE 1

| Degree | Left flight | Left-center flight | Center flight | Right-center flight | Right flight |
| --- | --- | --- | --- | --- | --- |
| First degree | −1.0 | 0.0 | +1.0 | 0.0 | −1.0 |
| Second degree | −2.0 | −1.0 | 0.0 | −1.0 | −2.0 |
| Third degree | −3.0 | −2.0 | −1.0 | −2.0 | −3.0 |
| Fourth degree | −4.0 | −3.0 | −2.0 | −3.0 | −4.0 |

Figure 8:
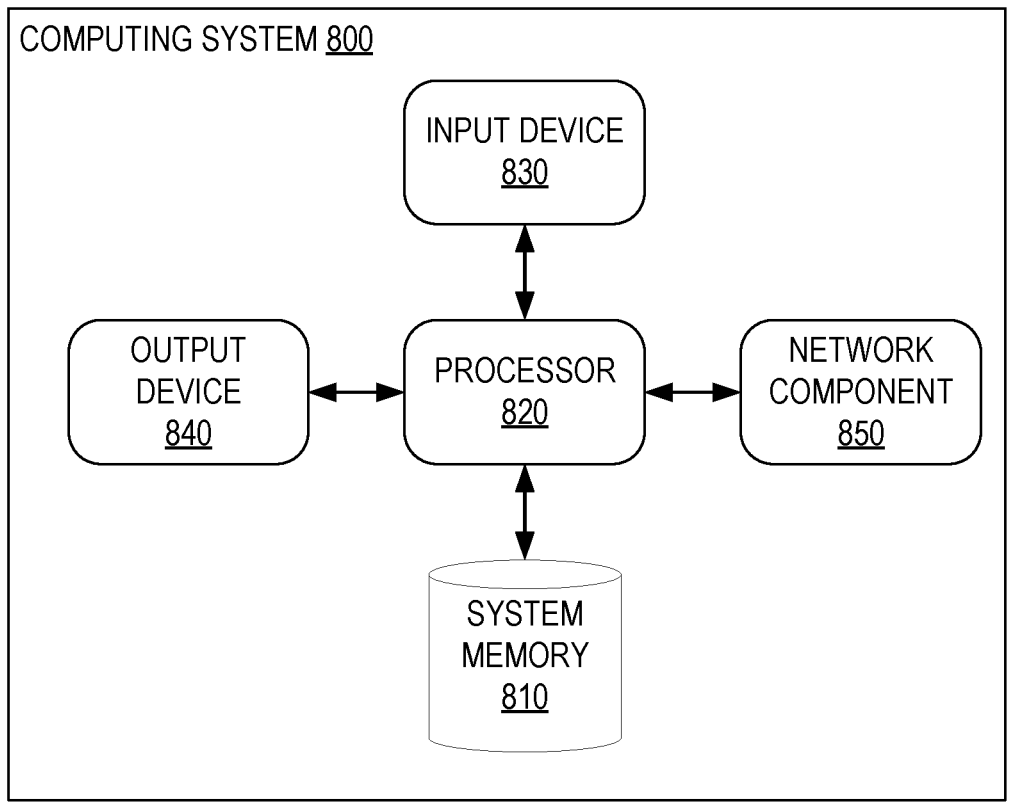
FIG. 8 is a schematic drawing of an example computing system that may be used with the system shown in FIG. 4.

FIG. 8 shows an example computing system 800 configured to perform one or more computing operations. While some examples of the disclosure are illustrated and described herein with reference to the computing system 800 being included in a leveling machine 100 (shown in FIG. 1), roller assembly 200 (shown in FIGS. 2 and 3), and/or a system 300 (shown in FIG. 4), aspects of the disclosure are operable with any computing system (e.g., sensor units 310) that executes instructions to implement the operations and functionality associated with the computing system 800. The computing system 800 shows only one example of a computing environment for performing one or more computing operations and is not intended to suggest any limitation as to the scope of use or functionality of the disclosure.

In some examples, the computing system 800 includes a system memory 810 (e.g., computer storage media) and a processor 820 coupled to the system memory 810. The processor 820 may include one or more processing units (e.g., in a multi-core configuration). Although the processor 820 is shown separate from the system memory 810, examples of the disclosure contemplate that the system memory 810 may be onboard the processor 820, such as in some embedded systems.

The system memory 810 stores data associated with one or more work materials and/or blanks and computer-executable instructions, and the processor 820 is programmed or configured to execute the computer-executable instructions for implementing aspects of the disclosure using, for example, the interface component 322 and/or servo component 324. For example, at least some data may be associated with work materials, blanks, blank conditions, and/or degrees of blank conditions such that the computer-executable instructions enable the processor 820 to manage or control one or more operations of the leveling machine 100, roller assembly 200, and/or system 300.

The system memory 810 includes one or more computer-readable media that allow information, such as the computer-executable instructions and other data, to be stored and/or retrieved by the processor 820. In some examples, the processor 820 executes the computer-executable instructions to determine a blank condition associated with a first blank, automatically determine an arrangement of a plurality of rollers based on the determined blank condition, present one or more parameters associated with the determined arrangement, and automatically move the rollers based on the determined arrangement.

By way of example, and not limitation, computer-readable media may include computer storage media and communication media. Computer storage media are tangible and mutually exclusive to communication media. For example, the system memory 810 may include computer storage media in the form of volatile and/or nonvolatile memory, such as read only memory (ROM) or random access memory (RAM), electrically erasable programmable read-only memory (EEPROM), solid-state storage (SSS), flash memory, a hard disk, a floppy disk, a compact disc (CD), a digital versatile disc (DVD), magnetic tape, or any other medium that may be used to store desired information that may be accessed by the processor 820. Computer storage media are implemented in hardware and exclude carrier waves and propagated signals. That is, computer storage media for purposes of this disclosure are not signals per se.

A user or operator may enter commands and other input into the computing system 800 through one or more input devices 830 (e.g., sensor units 310) coupled to the processor 820. The input devices 830 are configured to receive information (e.g., from the user). Example input device 830 include, without limitation, a pointing device (e.g., mouse, trackball, touch pad, joystick), a keyboard, a game pad, a controller, a microphone, a camera, a gyroscope, an accelerometer, a position detector, and an electronic digitizer (e.g., on a touchscreen). Information, such as text, images, video, audio, and the like, may be presented to a user via one or more output devices 840 coupled to the processor 820. The output devices 840 are configured to convey information (e.g., to the user). Example, output devices 840 include, without limitation, a monitor, a projector, a printer, a speaker, a vibrating component. In some examples, an output device 840 is integrated with an input device 830 (e.g., a capacitive touch-screen panel, a controller including a vibrating component).

One or more network components 850 may be used to operate the computing system 800 in a networked environment using one or more logical connections. Logical connections include, for example, local area networks, wide area networks, and the Internet. The network components 850 allow the processor 820, for example, to convey information to and/or receive information from one or more remote devices, such as another computing system or one or more remote computer storage media. In some examples, the network components 850 are coupled to one or more artificial neural networks that "learn" and/or evolve based on information or insights gained through the processing of one or more signals 312, blank conditions, and/or degrees of blank conditions. Network components 850 may include a network adapter, such as a wired or wireless network adapter or a wireless data transceiver.

Example leveling systems are described herein and illustrated in the accompanying drawings. For example, the interactive graphical user interface described herein allows a user to easily, efficiently, and/or precisely level one or more blanks. The examples described herein are able to automatically determine an arrangement of rollers based on a blank condition, and automatically move the rollers in accordance with the determined arrangement. This written description uses examples to disclose aspects of the disclosure and also to enable a person skilled in the art to practice the aspects, including making or using the above-described systems and executing or performing the above-described methods.

Having described aspects of the disclosure in terms of various examples with their associated operations, it will be apparent that modifications and variations are possible without departing from the scope of the disclosure as defined in the appended claims. That is, aspects of the disclosure are not limited to the specific examples described herein, and all matter contained in the above description and shown in the accompanying drawings shall be interpreted as illustrative and not in a limiting sense. For example, the examples described herein may be implemented and utilized in connection with many other applications such as, but not limited to, manufacturing equipment.

Components of the systems and/or operations of the methods described herein may be utilized independently and separately from other components and/or operations described herein. Moreover, the methods described herein may include additional or fewer operations than those disclosed, and the order of execution or performance of the operations described herein is not essential unless otherwise specified. That is, the operations may be executed or performed in any order, unless otherwise specified, and it is contemplated that executing or performing a particular operation before, contemporaneously with, or after another operation is within the scope of the disclosure. Although specific features of various examples of the disclosure may be shown in some drawings and not in others, this is for convenience only. In accordance with the principles of the disclosure, any feature of a drawing may be referenced and/or claimed in combination with any feature of any other drawing.

When introducing elements of the disclosure or the examples thereof, the articles "a," "an," "the," and "said" are intended to mean that there are one or more of the elements. References to an "embodiment" or an "example" of the present disclosure are not intended to be interpreted as excluding the existence of additional embodiments or examples that also incorporate the recited features. The terms "comprising," "including," and "having" are intended to be inclusive and mean that there may be elements other than the listed elements. The phrase "one or more of the following: A, B, and C" means "at least one of A and/or at least one of B and/or at least one of C."

The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of automatically adjusting operational parameters of a leveling machine including a plurality of rollers, the method comprising:
   presenting, at a user interface, a plurality of blank conditions;
   receiving, at the user interface, a selection of a first blank condition of the plurality of blank conditions;
   determining an arrangement of the plurality of rollers based on the selection of the first blank condition; and
   moving the plurality of rollers based on the determined arrangement.

2. The method of claim 1, further comprising:
   presenting, at the user interface, a plurality of blank condition severities; and
   receiving, at the user interface, a selection of a first blank condition severity of the plurality of blank condition severities, wherein the arrangement is determined based on the selection of the first blank condition.

3. The method of claim 2, further comprising determining an adjustment of the arrangement associated with the selection of the first blank condition.

4. The method of claim 1, further comprising receiving user input associated with one or more features of a work material, wherein the arrangement is determined based on the one or more features associated with the work material.

5. The method of claim 1, further comprising:
   determining a position of the plurality of rollers; and
   presenting, at the user interface, the position of the plurality of rollers.

6. The method of claim 1, further comprising actuating one or more servomotors to move one or more beams coupled to the plurality of rollers for moving the plurality of rollers.

7. The method of claim 1, further comprising rotating the plurality of rollers using a timing belt to move the work material.

8. The method of claim 1, further comprising presenting, at the user interface, one or more parameters associated with the arrangement.

9. A system comprising:
   a roller assembly including a plurality of rollers; and
   a control unit configured to present, at a user interface, a plurality of blank conditions, receive, at the user interface, first user input associated with a first blank condition of the plurality of blank conditions, determine an arrangement of the plurality of rollers based on the first blank condition, and communicate with the roller assembly to move the plurality of rollers based on the arrangement.

10. The system of claim 9, wherein the control unit is configured to present, at the user interface, a plurality of blank condition severities, and receive, at the user interface, second user input associated with a first blank condition severity of the plurality of blank condition severities, wherein the arrangement is determined based on the first blank condition severity.

11. The system of claim 10, wherein the control unit is configured to determine an adjustment of the arrangement associated with the first blank condition severity.

12. The system of claim 9, wherein the control unit is configured to receive, at the user interface, second user input associated with one or more features of a work material, wherein the arrangement is determined based on the one or more features associated with the work material.

13. The system of claim 9, further comprising one or more sensor units, wherein the control unit is configured to communicate with the one or more sensor units to determine a position of the plurality of rollers and present, at the user interface, the position of the plurality of rollers.

14. The system of claim 9 further comprising one or more servomotors, wherein the roller assembly includes one or more beams coupled to the plurality of rollers, and the control unit is configured to actuate the one or more servomotors to move the one or more beams.

15. The system of claim 9, wherein the roller assembly includes a timing belt configured to rotate the plurality of rollers.

16. The system of claim 9, wherein the control unit is configured to present, at the user interface, one or more parameters associated with the arrangement.

17. A control unit comprising:
   an interface component configured to present a plurality of blank conditions and receive first user input associated with a first blank condition of the plurality of blank conditions; and
   a servo component configured to determine an arrangement of a plurality of rollers based on the first blank condition, and move the plurality of rollers based on the arrangement.

18. The control unit of claim 17, wherein the interface component is configured to present a plurality of blank condition severities and receive second user input associated with a first blank condition severity of the plurality of blank condition severities, wherein the servo component is configured to adjust the arrangement of the plurality of rollers based on the first blank condition.

19. The control unit of claim 17, wherein the interface component is configured to receive second user input associated with one or more features of a work material, wherein the servo component is configured to adjust the arrangement of the plurality of rollers based on the one or more features of the work material.

20. The control unit of claim 17, wherein the servo component is configured to actuate one or more servomotors to move one or more beams coupled to the plurality of rollers for moving the plurality of rollers.

* * * * *